Sept. 12, 1961 J. WEHN ET AL 2,999,563
ARRANGEMENT FOR SEPARATING OUT FINE
SOLID PARTICLES DISPERSED IN GASES
Filed Oct. 16, 1957 2 Sheets-Sheet 1

INVENTORS:
JULIUS WEHN, HANS RUMPF.
BY Burgers, Dinklage + Sprung
ATTORNEYS

Sept. 12, 1961  J. WEHN ET AL  2,999,563
ARRANGEMENT FOR SEPARATING OUT FINE
SOLID PARTICLES DISPERSED IN GASES
Filed Oct. 16, 1957  2 Sheets-Sheet 2

INVENTORS
JULIUS WEHN. HANS RUMPF.
BY
Burgess, Dinklage & Sprung
ATTORNEYS

United States Patent Office 2,999,563
Patented Sept. 12, 1961

2,999,563
ARRANGEMENT FOR SEPARATING OUT FINE SOLID PARTICLES DISPERSED IN GASES
Julius Wehn, Leverkusen, and Hans Rumpf, Karlsruhe, Germany, assignors to Farbenfabriken Bayer Aktiengesellschaft, Leverkusen, Germany, a corporation of Germany
Filed Oct. 16, 1957, Ser. No. 690,552
Claims priority, application Germany Oct. 19, 1956
5 Claims. (Cl. 183—83)

This invention relates to an arrangement for separating out fine solid particles dispersed in gases.

The separation of such particles by means of cyclones presents considerable difficulties. Powders with particle sizes of less than $2\mu$, for example pigments, can only be separated out in cyclones if the powders are flowing therein in more or less agglomerated form and not as individual particles. Due to the centrifugal acceleration, the agglomerates moving towards the outside are projected on to the wall of the cyclone and broken up again. Owing to the tendency of the material to adhere, a more or less solid layer is formed on the wall, giving an irregular surface which impedes the attainment of a satisfactory flow and thus lowers the degree of separation. The layer must be repeatedly removed by striking or tapping the outside wall of the cyclone. It is known to eliminate deposits in cyclones, through which air-containing dust flows, by constructing the wall surfaces affected by the crust formation from elastic and thus deformable materials, for example soft rubber, which are impervious to gas and solid material, any deposit forming on the walls being periodically detached and removed by mechanical deformation of the walls. These arrangements have the disadvantage that there is very strong interference with the downward vortex motion in the cyclone at the instant at which the deposited layers are detached, and this interference has an unfavourable influence on the degree of separation.

It has now been found that the said disadvantages can be avoided, and a separation of ultra-fine powders from mixtures of dust and air can proceed with a high separation efficiency, if a cyclone-like insert which is pervious to gas and dust is arranged in an outer container. The inserts advantageously consist of screening elements, which are preferably made of plastic threads. They can, however, alternatively be made of perforated plastic foil, for example a perforated foil consisting of polymerisation products of tetrafluoro-ethylene. If the ratio between the height and width of the injection pipe is so large that the material is injected into the cyclone in a comparatively thin layer, an initial granulation occurs immediately the powder impinges on the screening surface. If the wire thickness is so chosen in relation to the size of mesh and to the prevailing diameter of the screening cyclone that a pulsating deformation of the cyclone element occurs under the influence of the upward flow of the powder, the whole or part of the fine powder passes as a screened granulate through the screening wall of the cyclone element into the space between the container and cyclone element. It is advantageous to make the size of mesh in the direction of flow substantially larger than in the transverse direction in order to compensate for the apparent reduction in the size of the mesh due to the impact of the material at an acute angle on the screen. The speed of these granulates is reduced to such an extent by the screen that when the loose agglomerates impinge on the wall of the container surrounding the cyclone element, no deposition occurs because of rebound. The cyclone screening element can be capable of flexing elastically, so that any deposit forming on its internal surface can fly off in status nascendi owing to the deformation of this deposit resulting from the flow of gas and can then pass completely or partially through the screening holes, some of the solid material flowing inside and some outside the cyclone element to a discharge point for the solid material. A plurality of screening cyclones can be installed in parallel in a manner known per se in a common outer casing to serve as multi-cyclones.

Figure 1:
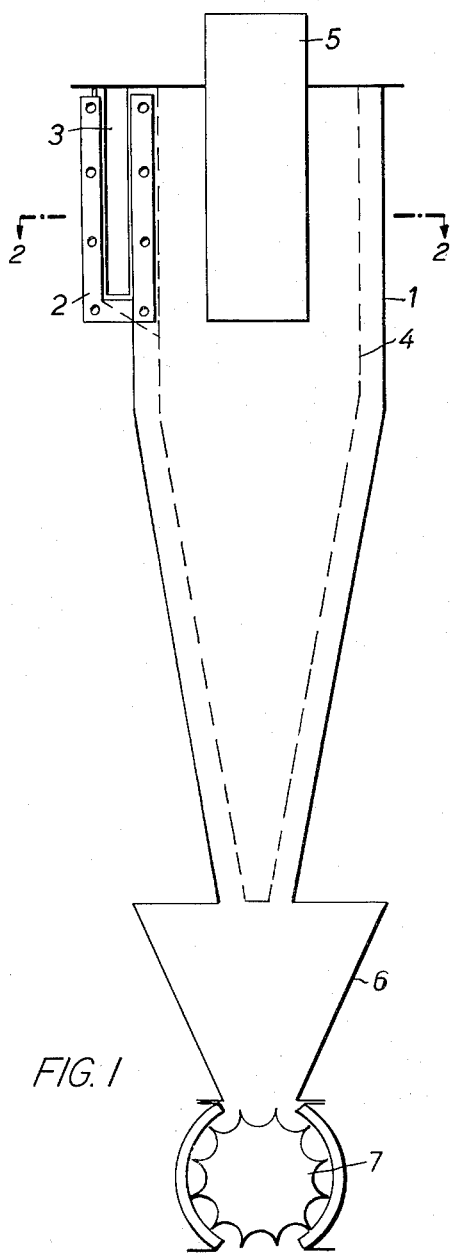
FIG. 1 is a vertical sectional view of a construction for separating out fine solid particles in accordance with the invention.
Figure 2:
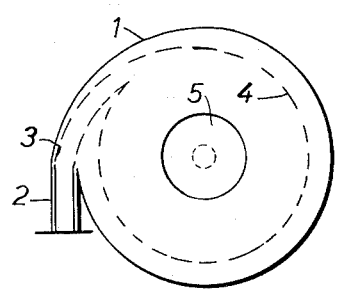
FIG. 2 is a horizontal cross sectional view taken along the line 2—2 of FIG. 1.
Figure 3:
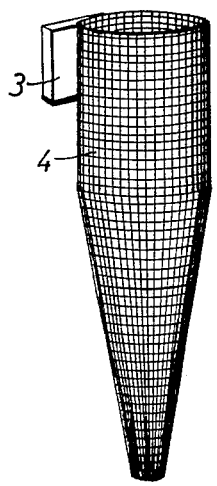
FIG. 3 is a perspective view of a pervious cyclone element in the form of a screen made up of plastic threads.
Figure 4:
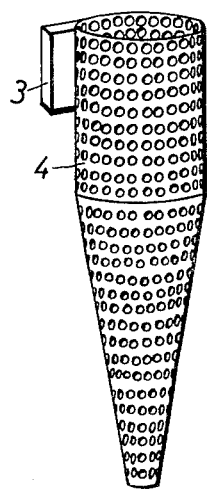
FIG. 4 is a perspective view of another pervious element in the form of a perforated plastic material such as a perforated plastic foil.

The spacing between the container wall and the cylcone element must be so chosen that the particles passing through the screen-like cyclone element reach the outside wall with only a small velocity. One embodiment of the arrangement according to the invention is shown in the accompanying drawing, which shows an outer conical shaped container 1, an injection pipe 2 which extends tangentially into the outer container as shown in FIG. 2, an injection pipe 3 which extends tangentially into a screening cyclone 4 as shown in FIG. 2 for introducing a current of particle laden gas into the container, the gas whirling around the inside of the container and then passing upwardly through, an outlet pipe 5 for the gas. The agglomerated granules settle out and are removed via a settling chamber 6 and a bucket wheel 7 for discharging the solid material.

We claim:

1. An arrangement for separating out fine solid particles dispersed in gases comprising a cyclone container, a cyclone element which is pervious to gas and said solid particles and which is arranged in said container at a distance from the inside wall and coextensive with respect to said inside wall, means to introduce gas into the interior of said cyclone element in whirling fashion, said cyclone element having a thickness, flexibility and mesh size such that a pulsating deformation of said cyclone element occurs under the influence of the flow of the particle containing gas through said arrangement and a common discharge chamber for the cyclone container and the cyclone element.

2. An arrangement according to claim 1 wherein the openings in the pervious cyclone element are chosen so as to permit passage therethrough of all of the particles.

3. An arrangement according to claim 1, wherein the pervious cyclone element is of screen-like construction.

4. An arrangement according to claim 3, wherein the pervious cyclone element is made of plastic threads.

5. An arrangement according to claim 1, wherein the pervious cyclone element consists of perforated material which is elastically flexible.

References Cited in the file of this patent

UNITED STATES PATENTS

| | | |
|---|---|---|
| 802,651 | Meadon | Oct. 24, 1907 |
| 938,656 | Frickey | Nov. 2, 1909 |
| 938,702 | Porbeck | Nov. 2, 1909 |
| 2,873,001 | Gerdman | Feb. 10, 1959 |

FOREIGN PATENTS

| | | |
|---|---|---|
| 456,316 | France | June 16 1913 |